United States Patent [19]

Nanba et al.

[11] Patent Number: 4,937,464
[45] Date of Patent: Jun. 26, 1990

[54] MODULAR JACK WITH LOOP TESTING SWITCH

[75] Inventors: Kaoru Nanba; Masao Nakamura; Yoshihiro Nakamura, all of Tokyo, Japan

[73] Assignee: Oki Electric Industry Co., Ltd., Tokyo, Japan

[21] Appl. No.: 292,889

[22] Filed: Jan. 3, 1989

[30] Foreign Application Priority Data

Jan. 12, 1988 [JP] Japan .................................. 63-2215[U]

[51] Int. Cl.⁵ ........................ H04M 9/00; H01R 13/00
[52] U.S. Cl. ......................................... 307/112; 379/5; 379/27; 379/399; 439/344; 439/620
[58] Field of Search ...................... 307/112, 113, 115; 340/825, 825.05, 825.06, 825.16; 370/15; 379/5, 27–29, 19, 397, 399, 442; 371/22, 22.1; 200/51.05, 547; 439/344, 620, 676, 709; 174/59, 60

[56] References Cited

U.S. PATENT DOCUMENTS

| 4,415,778 | 11/1983 | Turner | 379/8 |
| 4,582,964 | 4/1986 | Pickens | 379/5 |
| 4,626,633 | 12/1986 | Ruehl et al. | 379/27 |
| 4,748,651 | 5/1988 | Collins et al. | 379/22 |

Primary Examiner—A. D. Pellinen
Assistant Examiner—David Osborn
Attorney, Agent, or Firm—Spencer & Frank

[57] ABSTRACT

A modular jack has a switch located between the jack's contacts and its screw terminals. The switch permits (1) simultaneous loop testing from both sides, (2) loop testing from one side while the other side is disconnected, and (3) normal communications. The modular jack is recommended for use between a PBX and computer equipment.

6 Claims, 9 Drawing Sheets

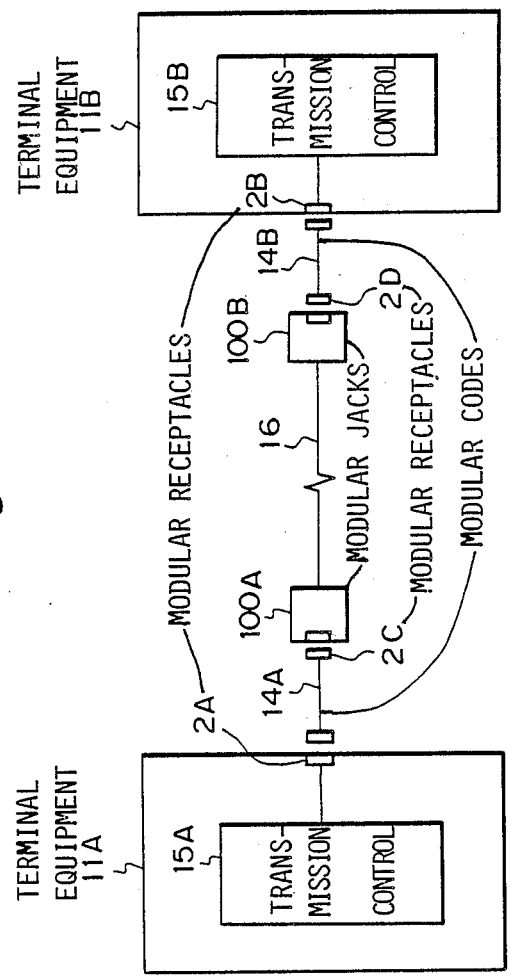

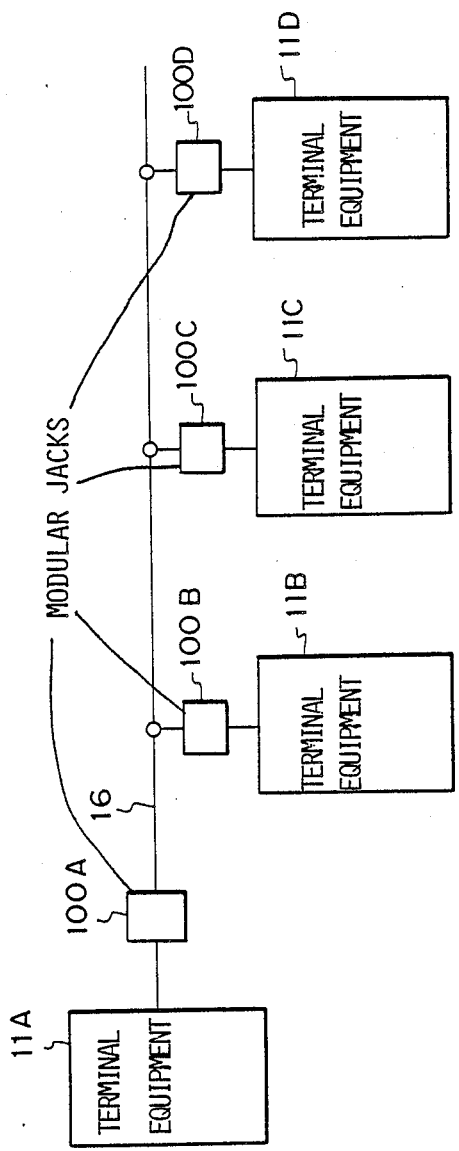

MODULAR JACK WITH LOOP TESTING SWITCH

BACKGROUND OF THE INVENTION

The present invention relates to a modular jack for data transmission for connecting a transmission line and a terminal equipment.

Conventionally, there has been provided a panel on a terminal equipment such as a personal comuter, facsimile machine and the like for connecting with a transmission line such as a private branch exchange, a circuit exchange and the like. The panel is used not only for connecting with the transmission line but also for diagnosing trouble both in the terminal equipment and the transmission line. Accordingly, the panel is provided with a U-link for disconnecting the terminal equipment from the transmission line and a switch for switching the connection of the terminal equipment to the transmission line or the loop test side, as well as being provided with a circuit connection terminal for connecting the terminal equipment with the transmission lines. Provided that the switch is switched to the loop test side, transmission lines associated with the terminal equipment are connected with receiving lines associated with the terminal equipment. This loop test is adopted for diagnosing trouble in the data transmission system according to CCITT advisory V 54. However, mounting the panel on the terminal equipment generates the problem that it is required to provide the U-link for diagnosing data transmission trouble, the manufactured panel must have a shape or a specification adapted to each terminal equipment depending on the number of transmission lines, namely, two transmission lines or four transmission lines. Accordingly, it is expensive to manufacture a panel as well as difficult to miniaturize the terminal equipment since the panel takes up space in the terminal equipment.

SUMMARY OF THE INVENTION

It is therefore an object of the present invention to provide a modular jack for data transmission capable of miniaturizing the terminal equipment while trouble in data transmission between the terminal equipment and the transmission line can be diagnosed by testing a loop circuit formed in one or both of a terminal equipment side and a transmission lines side.

It is a second object of the present invention to provide a modular jack for data transmission capable of reducing the cost of diagnosing trouble in data transmission by testing a loop circuit formed in one or both of the terminal equipment side and the transmission lines side.

To achieve the above objects of the present invention, the modular jack for data transmission comprises a plurality of terminals for connection with the terminal equipment, a plurality of terminals for connection with the transmission lines, a switching means for switching the state of connection between a plurality of terminals for connection with the terminal equipment and the plurality of terminals for connection with the transmission lines in response to the usage thereof such as transmitting, receiving the data or diagnosing the trouble in the data transmission and a circuit for connecting the switching means with the plurality of terminals for connection with the terminal equipment and the plurality of terminals for connection with the transmission lines.

With the arrangment of the modular jack for data transmission, if the switching means is switched to a first state the terminal equipment and the transmission lines are connected with each other to effect data transmission between terminal equipments. If the switching means is switched to a second state, transmitting signal lines of the terminal equipment are connected with the receiving signal lines of the terminal equipment, while transmitting signal lines of the transmission lines are connected with the receiving signal lines of the transmission lines for forming loop circuits both in the terminal equipment side and the transmission lines side so that troubles both in terminal equipment side and the transmission lines side are respectively diagnosed while distinguishing the terminal equipment side from the transmission lines side. If the switching means is switched to a third state, the transmitting and receiving signal lines of the transmission lines side are disconnected from each other and from those of the terminal equipment side while the transmitting signal lines of the terminal equipment are connected to the receiving signal lines of the terminal equipment for forming a loop circuit only at the terminal equipment side so that trouble only in the terminal equipment side can be diagnosed.

Inasmuch as the state of connection between the terminal equipment side and the transmission lines side can be shifted by only the operation of the switching means provided inside the modular jack, it is possible to miniaturize the terminal equipment and reduce the cost of diagnosing trouble in the terminal equipment and the transmission lines by testing the loop circuit formed in one or both of the terminal equipment and the transmission lines.

The above and other objects, features and advantages of the present invention will become more apparent from the following description taken in conjunction with the accompanying drawings.

Figure 5:
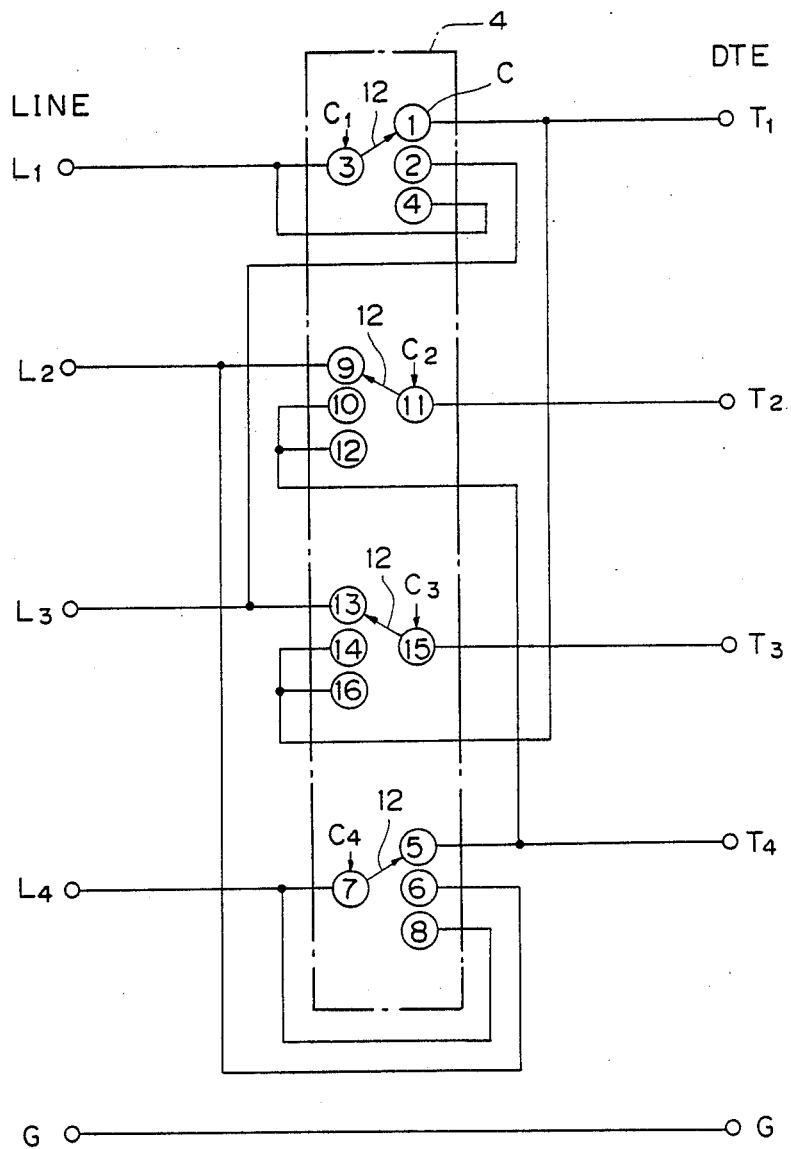
FIG. 5 is a block diagram of a switching means, one of the components of the modular jack of FIG. 1.
Figure 7A:
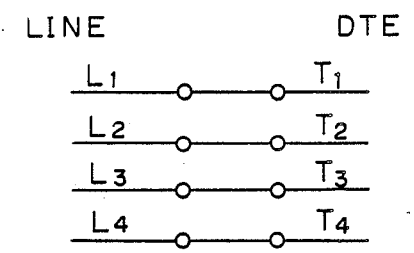
Figure 9:
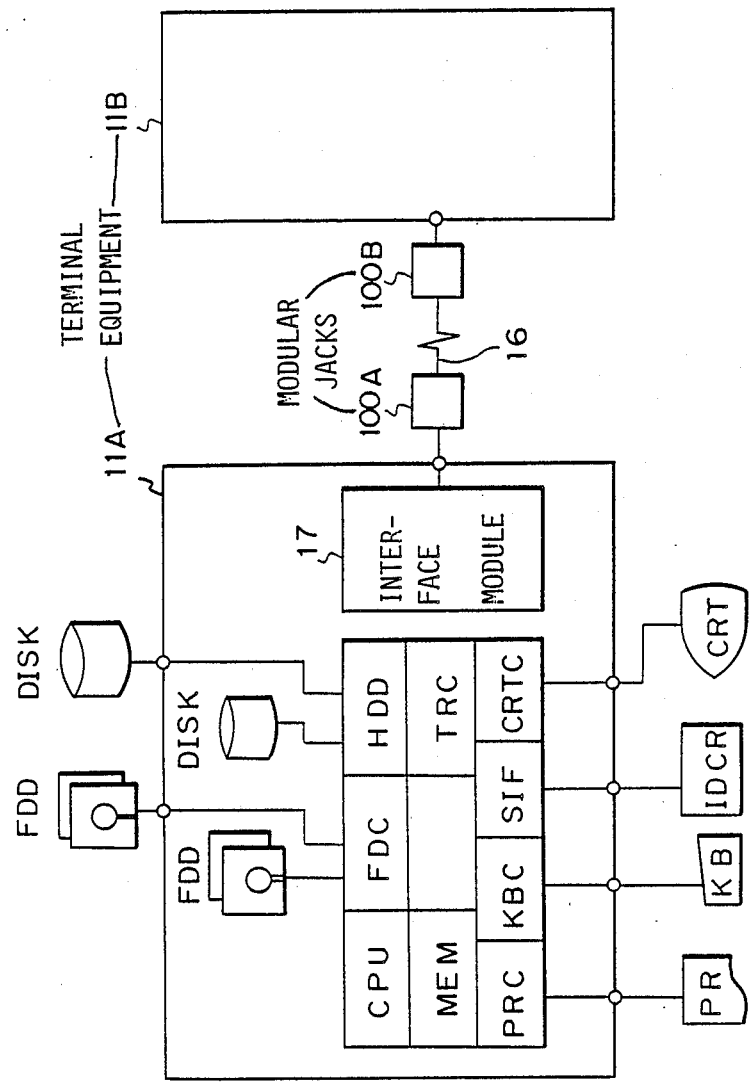

FIG. (a), (b), (c) are respectively views of assistance in explaining the state of connection between the terminal equipment and transmission lines on the basis of the switching position of the switching means of FIG. 5;

FIG. 7(a), (b), (c), are respectively views of assistance in explaining the state of connection between transmitting and receiving signal lines of the terminal equipment and those of the transmission lines on the basis of the operational positions of the switching means of FIG. 5;

FIG. 8 is a view of assistance in explaining a first usage of the modular jack of the preferred embodiment of the present invention;

FIG. 9 is a view of assistance in explaining a second usage of the modular jack of the preferred embodiment of the present invention; and FIG. 10 is a view of assistance in explaining a third usage of the modular jack of the preferred embodiment of the present invention.

DESCRIPTION OF THE PREFERRED EMBODIMENT

A modular jack for data transmission according to a preferred embodiment of the present invention will be described in detail with reference to FIGS. 1 to 4.

A modular jack for data transmission (hereinafter referred to simply as a modular jack) 100 comprises a base 2 having a plurality of hollow supporters 13 fixedly mounted thereon and provided with a printed circuit board 9 fixedly mounted on the supporters 13, and a cover 1 covering the base 2 and having one notched hole or window 5 provided at the upper surface thereof, a first notched portion 6 provided at one side surface thereof and a second notched portion 8 provided at the other side surface thereof opposite to the one side surface. The notched hole or the window 5 is provided for operating a control lever 4a of a slide switch 4, which is slightly projected from the notched hole 5 when the switch 4 is mounted on the printed circuit board 9 and can be switched to the three operational positions or stages for effecting data transmission or diagnosing trouble in the data transmission. The first notched portion 6 is provided for connecting a modular receptacle 3 mounted on the printed circuit board 9 at the one end thereof with a modular plug (not shown). The receptacle 3 has terminals for signal lines which are connected to the terminal equipment via the modular codes. The second notched portion 8 is provided for guiding the lines connected to the line connection terminals 7a, 7b, 7c, 7d, 7e and 7f fixedly mounted on the printed circuit board 9 to the inside of the modular jack 100. The printed circuit board 9 has, at the other end thereof opposite to the receptacle 3, a notched portin 11 for gathering and guiding the lines connected to the line connection terminals 7a, 7b, 7c, 7d, 7e and 7f to the notched portion 8 and a catch 2a provided over an opened end of the notched portion 11 for preventing the lines gathered in the notched portion from moving upward. As set forth above, the printed circuit board 9 also has the receptacle 3, the slide switch 4 and the line connection terminals 7a through 7f respectively fixedly mounted thereon. The printed circuit board 9 also has a hole 10 for fixing the modular jack 100 to a wall or a post by a screw. The same hole 10 is also provided on the base 2 for screwing the modular jack 100 on the wall or post. The hole 10 can be omitted when the modular jack 100 is fixed to a wall or the like by adhesive tape.

Figure 1:
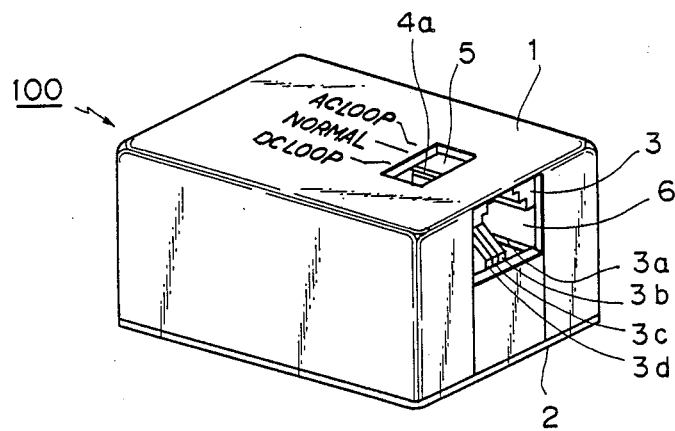
FIG. 1 is a perspective view of a modular jack for data transmission according to a preferred embodiment of the present invention.
Figure 2:
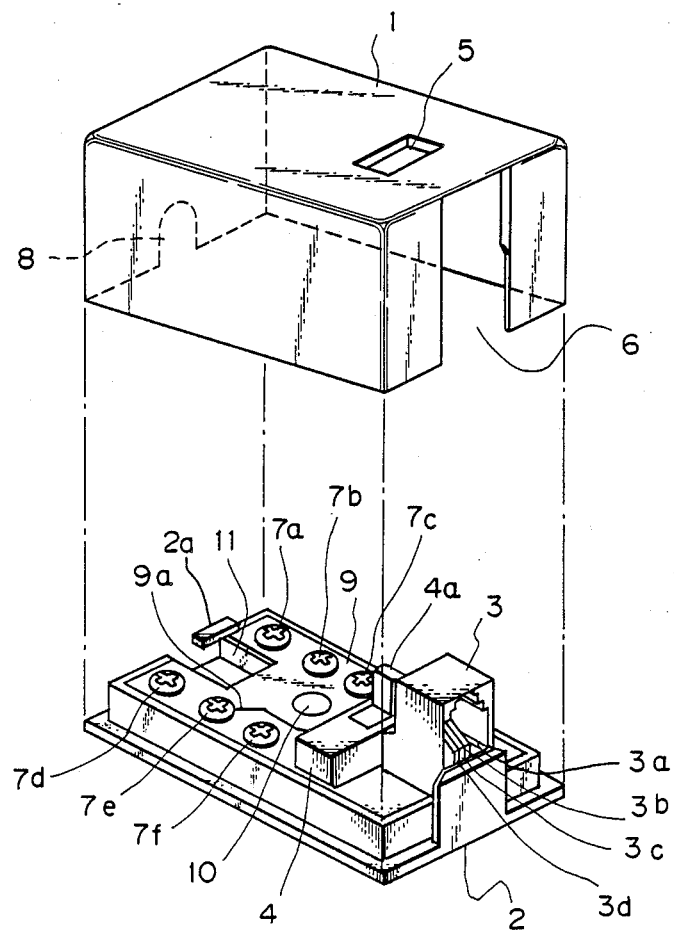
FIG. 2 is an exploded perspective view of the modular jack for data transmission of FIG. 1.
Figure 3:
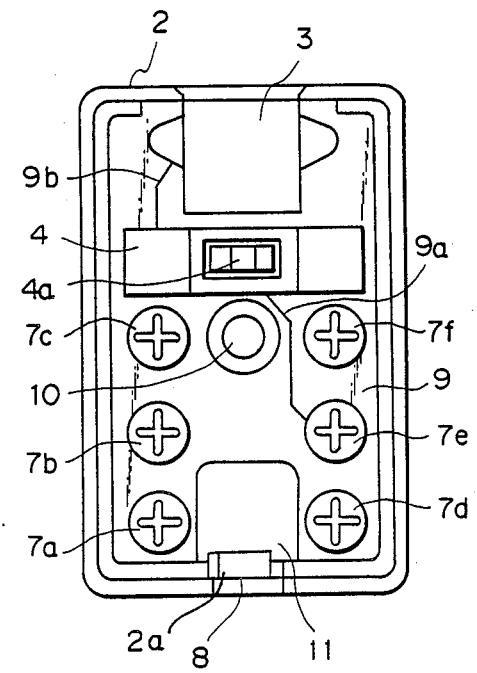
FIG. 3 is a plan view of the modular jack for data transmission of FIG. 2, in which the cover of the modular jack is removed.
Figure 4:
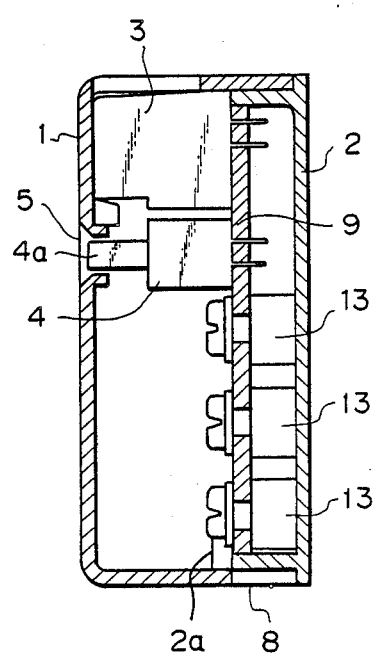
FIG. 4 is a cross sectional view of the modular jack for data transmission of FIG. 1.

The number of line connection terminals 7a through 7f in FIGS. 2 and 3 is six for use with four lines. Two of the terminals are for transmitting signal lines, two for receiving signal lines, one for grounding, and one for a preparatory use. Accordingly, four line connection terminals can be employed as the two lines circuit. The number of signal line connection terminals 3a, 3b, 3c and 3d of the receptacle 3 including two other terminals (not shown) is six in FIGS. 1 and 2. The signal line connection terminals 3a through 3d have the same purpose as those of the line connection lines 7a through 7f. The printed circuit board 9 has printed wiring for connecting the line connection terminals 7a through 7f with each contact point of the slide switch 4 and printed wiring for connecting each contact point of the slide switch 4 with the signal line connection terminals 3a through 3d and the other two terminals (not shown) of the receptacle 3. Among the printed wiring, the wiring 9a, 9b are printed on the surface of the printed circuit board 9 and other wiring is printed on the rear surface of the printed circuit board 9 to prevent the wiring from being too intricate. The wiring 9a is provided for connecting the line connection terminal 7e with one of the contact points of the slide switch 4 and the wiring 9b for connecting one of the contact points of the slide switch 4 with one of the signal connection terminals of the receptacle 3.

The slide switch 4 is described in detail in accordance with FIG. 5.

Slide switch 4 has twelve contact points C in which C1, C2, C3, and C4 are common contact points and a movable arm 12 made of conductive material and interlocked with the operation of the control lever 4a of the slide switch 4. According to the present invention, the slide switch 4 has four circuits corresponding to each transmitting and receiving line since four transmission lines are assumed. In the fugure, LINE is designated as the transmission lines side, and DTE as the terminal equipment side. Designated at L1, L2 are transmitting signal lines of the transmission lines side while L3, L4 are receiving signal lines of the transmission lines side, and T1, T2 are transmitting signal lines of the terminal equipment side while T3, T4 are receiving signal lines of the terminal equipment side. The control lever 4a of the slide switch 4 according to the present invention can be switched to three positions (hereinafter referred to as three operational positions). The four circuits of the slide switch 4 are structured in the manner that the common contact points C1, C2, C3, C4 each can make contact with one of three contacts points via the movable arm 12.

The three operational positions are described in detail herewith.

In the first operational position, the transmission lines can be connected so that normal data transmission can be effected between the terminal equipment side and the transmission lines side. In the second operational position, the transmission lines side are separated from the terminal equipment side so that the transmitting signal lines and the receiving signal lines of the transmission lines side and those of the terminal equipment side are connected with each other as loop connections or by forming loop circuits for enabling diagnosis of trouble in both the terminal equipment and the transmission lines. In the third operational position, the transmitting signal lines of the terminal equipment side are connected with the receiving signal lines of the terminal equipment side as a loop connection for enabling diagnosis of trouble in the terminal equipment. In the loop connections in the second and third operational positions, the signals of the transmitting signal lines of the terminal equipment side, are supplied by return to the receiving signal lines of the terminal equipment side. A test of the loop connections or the loop circuit for diagnosing trouble in data transmission is defined in CCITT (Comite Consultatif International Telegraphique et Telephonique) Advisory V 54.

The connection states and operations between the terminal equipment and the transmission lines in the three operational positions are described in detail with reference to FIGS. 6 to 10.

Figure 6A:
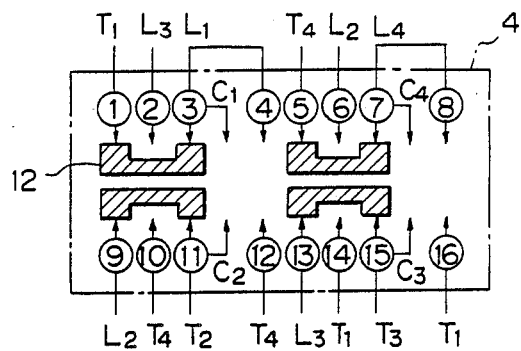

In the first operational position in which the control lever 4a of the slide switch 4 is switched to the left side shown in FIG. 3, the common contact points 3, 7, 11, 15 are respectively in contact with the contact points 1, 5, 9, 13 via the movable arm 12 as illustrated in FIG. 6(a). The state of connection between the transmitting signal lines and the receiving signal lines both in the transmission lines sides LINE and the terminal equipment side DTE are arranged as illustrated in FIG. 7(a) as evident from the circuit diagram of the slide switch 4 in FIG. 5. The transmitting signal lines T1, T2 of the terminal equipment are connected with the transmitting signal lines L1, L2 of the transmission lines side while the receiving signal lines T3, T4 of the terminal equipment side are connected with the receiving lines L3, L4 of the transmission lines side. Accordingly, normal data transmission can be carried out between the terminal equipment side and the transmission lines side.

Figure 6B:
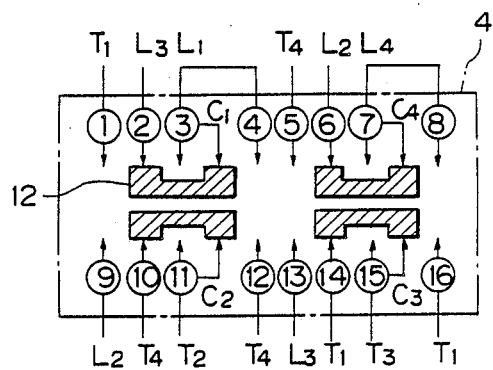
Figure 7B:
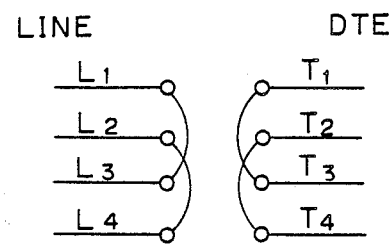

In the second oprational position in which the control lever 4a of the slide switch 4 is set to the middle side shown in FIG. 3, the common contact points 1, 7, 11, 15 are respectively in contact with the contact points 2, 6, 10, 14 via the movable arm 12 as illustrated in FIG. 6(b). The states of connection between the transmitting signal lines and the receiving signal lines both in the transmission lines side LINE and the terminal equipment side DTE are arranged as illustrated in FIG. 7(b) as evident from the circuit diagram of the slide switch 4 in FIG. 5. The transmitting signal lines are receiving signal lines T1 through T4 of the terminal equipment side are disconnected from the transmitting signal lines and the receiving signal lines L1 through L4 of the transmission lines side so that the transmitting signal lines T1, T2 of the terminal equipment side are connected with the receiving signal lines T3, T4 of the same while the transmitting signal lines L1, L2 of the transmission lines side are connected with the receiving signal lines L3, L4 of the same. Accordingly, two loop circuits are formed in both the terminal equipment side and the transmission lines side, namely, one loop circuit is formed between the transmitting signal line T1 and the receiving signal line T3 and the other loop circuit is formed between the transmitting signal line T2 and the receiving signal line T4 in the terminal equipment side while one loop circuit is formed between the transmitting signal line L1 and the receiving signal line L3 and the other loop circuit is formed between the transmitting signal line L2 and the receiving signal line L4 in the transmission lines side so that trouble in the loop circuits in the terminal equipment side and the loop circuits in the transmission lines side are respectively diagnosed by testing each loop circuit thereof while distinguishing the terminal equipment side from the transmission lines side.

Figure 6C:
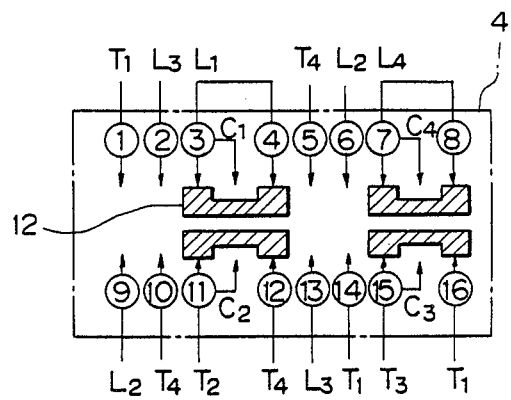
Figure 7C:
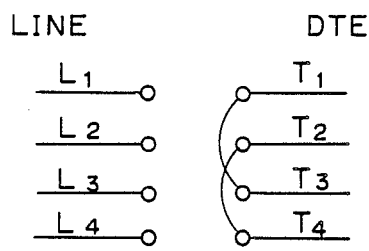

In the third operational position in which the control lever 4a of the slide switch 4 is set to the right side shown in FIG. 3, then the common contact points 3, 7, 11, 15 are respectively in contact with the contact points 4, 8, 12, 16 via the movable arm 12 as illustrated in FIG. 6(c). The states of connection between the transmitting signal lines and the receiving signal lines both in the transmission lines sides LINE and the terminal equipment side DTE are arranged as illustrated in FIG. 7(c) as evident from the circuit diagram of the slide switch 4 in FIG. 5. Both the transmitting signal lines and the receiving signal lines of the transmission lines side are disconnected from each other and from those of the terminal equipment side while the transmitting signal lines of the terminal equipment side T1, T2 are connected with the receiving signal lines T3, T4 of the same so that one loop circuit is formed between the transmitting signal line T1 and the receiving signal line T3, and other loop circuit is formed between the transmitting signal line T2 and the receiving signal line T4. Trouble in the loop circuits in the terminal equipment side can be diagnosed by testing each loop circuit thereof.

The connection state in the terminal equipment employing the modular jack according to the first embodiment of the present invention is described with reference to FIG. 8.

One terminal equipment 11A provided with a transmission controller 15A and a first modular receptacle 2A is connected with another terminal equipment 11B provided with a transmission controller 15B and a second modular receptacle 2B by an exclusive transmission line 16. The transmission path includes a modular jack 100A for data transmission of the terminal equipment 11A and provided with a third modular receptacle 2C which is connected with the first modular receptacle 2A via one modular code 14A and another modular jack 100B for data transmission of the terminal equipment 11B. Modular jack 100B is provided with a fourth modular receptacle 2D which is connected with the second modular receptacle 2B via another modular code 14B. The arrangement of the modular jack 100A is the same as that of the other modular jack 100B.

If the slide switches 4 of both modular jacks 100A and 100B are respectively set to the first operational positions illustrated in FIG. 6(a), the terminal equipments 11A and 11B can be connected with each other via transmission line 16 so that normal data transmission can be effected. If the slide switch 4 of the modular jack 100A is set to the second operational position, the signals transmitted from the modular jack 100A are returned at the modular jack 100A so that trouble in the loop circuit in the terminal equipment 11A can be diagnosed while the signals transmitted from the terminal equipment 11B are returned at the modular jack 100A via the transmission line 16 so that the trouble in the loop circuit in the terminal equipment 11B can be diagnosed. If the slide switch 4 of the modular jack 100A is set to the third operational position, the signals transmitted from the terminal equipment 11A are returned at the modular jack 100A so that trouble in the loop circuit in only the terminal equipment 11A can be diagnosed.

The connection state in terminal equipments employing the modular jack according to the second embodiment of the present invention is described with reference to FIG. 9.

According to the second embodiment, one of the terminal equipments is provided with a plurality of input and output devices and makes point to point connection with the other terminal 11B.

If the control lever 4a of the slide switch 4 of the modular switch 100A is set to the first operational position as the first embodiment, the terminal equipment 11A and the transmission line 16 are normally connected with each other so that the data transmission between each input and output device of the terminal equipment, which are controlled by a central processing unit (CPU), and the transmission line side can be effected. The input device in the terminal equipment 11A comprises a floppy disk (FDD) controlled by a floppy disk controller (FDC) and a hard disk (DISK) controlled by a hard disk controller (HDD). The output device in the terminal equipment 11A comprises a printer unit (PR) controlled by a printer controller (PRC), a keyboard unit (KB) controlled by a keyboard controller (KBC), a magnetic card reader (IDCR) controlled by a serial interface controller (SIF), a monitor display (CRT) controlled by a monitor display controller (CRTC). The terminal equipment further includes a main memory (MEM), the CPU, a transmission and a receiver controller (TRC), and a modem or an interface module 17.

If the control lever 4a of the slide switch 4 of the modular switch 100A is set to the second operational position, two loop circuits are formed in both the terminal equipment 11A and the transmission line side 16, so that trouble in both loop circuits in the terminal equipment 11a and the transmission line side 16 are respectively diagnosed by testing both loop circuits.

The connection state in the terminal equipments employing the modular jack according to the third embodiment of present invention will be described with reference to FIG. 10.

According to the third embodiment, a plurality of terminal equipments 11A, 11B, 11C, 11D are connected with each other by a multipoint connections. According to the third embodiment, the diagnosis made by setting the control lever 4a of the slide switch 4 to the third operational position is effective. That is, if the control lever 4a of the slide switch 4 at the side of the terminal equipment 11A is set to the third operational position, the diagnosis at the side of the terminal equipment 11A can be effected without interference from the mutual data transmission between the terminal equipments 11B, 11C, 11D.

Although the embodiments set forth above of the present invention relate to four lines data transmission on the basis of an exclusive transmission line, the present invention can be applied to two lines data transmission utilizing a private branch exchange.

Furthermore, the modular jack for data transmission according to the present invention employs the slide switch 4 but can employ a push button switch or other means to realize the switch circuit illustrated in FIG. 5.

Still further, although the slide switch 4 of the modular jack for data transmission according to the present invention has three operational positions, the number of operational positions can be changed to two or more than three when necessary. In that case, the circuit of the slide switch as illustrated in FIG. 5 is required to be changed to correspond with the number of operational positions.

Also, although a module receptacle is employed for connecting terminal equipments with the transmission line or disconnecting terminal equipments from the transmission lines, the terminals for connecting the terminal equipments can be provided in the modular jack without providing the modular receptacle.

Although the invention has been described in its preferred form with a certain degree of particularity, it is to be understood that many variations and changes are possible in the invention without departing from the scope thereof.

What is claimed is:
1. A modular jack, for use with a data transmission system including transmitting and receiving signal lines on a transmission lines side thereof and transmitting and receiving signal lines on a terminal equipment side thereof, comprising:
   a base;
   a plurality of first terminals mounted on said base for connection of the transmitting and receiving signal lines of said transmission lines side thereto;
   a modular receptacle mounted on said base, said receptacle having a plurality of second terminals for connection of the transmitting and receiving signal lines of said terminal equipment side thereto:
   switching means mounted on said base, said switching means having a plurality of positions for selectively interconnecting said plurality of first and second terminals; and
   circuit means for connecting said switching means to said plurality of first and second terminals, whereby the transmitting and receiving signal lines of said transmission lines and terminal equipment sides are selectively switched in accordance with the position of said switching means to (1) couple the transmitting and receiving signal lines of said transmission lines side to the transmitting and receiving signal lines of said terminal equipment side, and (2) isolate the signal lines of said transmission lines side from the signal lines of said terminal equipment side, and connect at least one of (a) the transmission signal lines of said transmission lines side to the receiving signal lines of said transmission lines side, and (b) the transmission signal lines of said terminal equipment side to the receiving signal lines of said terminal equipment side, for testing of said transmission lines and said terminal equipment.

2. A modular jack for data transmission according to claim 1, wherein said switching means is switchable to a first position wherein the transmitting and receiving signal lines of both the transmission lines side and the terminal equipment side are connected, data transmission being carried out between the transmission lines side and the terminal equipment side.

3. A modular jack for data transmission according to claim 1, wherein said switching means is switchable to a second position wherein the transmitting signal lines of the terminal equipment side are connected with the receiving signal lines thereof for forming a first loop circuit, and the transmitting signal lines of the transmission lines side are connected with the receiving signal lines thereof for forming a second loop circuit, whereby trouble in both the terminal equipment said and the transmission lines side are diagnosed by testing both of said first and second loop circuits.

4. A modular jack for data transmission according to claim 1, wherein said switching means is switchable to a third position wherein both the transmitting signal lines and the receiving signal lines of the terminal equipment side are disconnected from the transmitting and receiving signal lines or the transmission lines side, and the transmitting signal lines of the terminal equipment side are connected with the receiving signal lines thereof for forming a loop circuit between the transmitting signal lines of the terminal equipment side and the receiving signal lines thereof, whereby trouble in the terminal equipment side is diagnosed by testing said loop circuit.

5. A modular jack for data transmission according to claim 1, wherein said plurality of first and second terminals and said switching means are mounted on a printed circuit board attached to said base, and wherein said circuit means for connecting said switching means to said first and second terminals are wired by printing on the printed circuit board.

6. A modular jack for data transmission according to claim 1, wherein said modular jack is further provided with a cover having a window therein through which said switching means.

* * * * *